United States Patent
Sadasivam et al.

(10) Patent No.: US 8,984,349 B2
(45) Date of Patent: Mar. 17, 2015

(54) METHOD AND SYSTEM FOR AUTOMATING THE PROCESS OF TESTING A DEVICE

(71) Applicants: Sivasakthivel Sadasivam, Chennai (IN); Kannan Kariraman, Chennai (IN); Takameren Longkumer, Chennai (IN)

(72) Inventors: Sivasakthivel Sadasivam, Chennai (IN); Kannan Kariraman, Chennai (IN); Takameren Longkumer, Chennai (IN)

(73) Assignee: HCL Technologies Limited, Chennai, Tamil Nadu (IN)

( * ) Notice: Subject to any disclaimer, the term of this patent is extended or adjusted under 35 U.S.C. 154(b) by 236 days.

(21) Appl. No.: 13/630,187

(22) Filed: Sep. 28, 2012

(65) Prior Publication Data

US 2014/0095931 A1   Apr. 3, 2014

(51) Int. Cl.
- *G06F 11/00* (2006.01)
- *G06F 11/263* (2006.01)
- *G06F 11/36* (2006.01)

(52) U.S. Cl.
CPC ......... *G06F 11/263* (2013.01); *G06F 11/3688* (2013.01)

USPC .................................................. 714/46

(58) Field of Classification Search
CPC ........................ G06F 11/263; G06F 11/3688
See application file for complete search history.

(56) References Cited

U.S. PATENT DOCUMENTS

| | | | |
|---|---|---|---|
| 6,839,649 B2 * | 1/2005 | Kreider | 702/122 |
| 2008/0115027 A1 * | 5/2008 | Geller et al. | 714/738 |
| 2009/0077539 A1 * | 3/2009 | Booth | 717/124 |

* cited by examiner

*Primary Examiner* — Charles Ehne

(57) ABSTRACT

Device Test Automation framework. This embodiment provides a device test automation framework for automating testing of embedded systems. The device test automation framework—DTAF allows user to test embedded device software using test scripts, which can capture various interfaces of device under test. A Graphical User Interface—GUI tool is created based on device under test configuration and user input. This GUI tool shows various interface of device under test. A device test automation framework hardware enables communication between test tool and the device under test. DTAF allows testing process to dramatically improve productivity, effectiveness, efficiency and coverage of embedded software testing

10 Claims, 7 Drawing Sheets

METHOD AND SYSTEM FOR AUTOMATING THE PROCESS OF TESTING A DEVICE

The present application is based on, and claims priority from, IN Application Number 3298/CHE/2012, filed on 10 Aug. 2012, the disclosure of which is hereby incorporated by reference herein.

TECHNICAL FIELD

This embodiment relates to design test automation framework and in particular for automating testing of embedded systems.

BACKGROUND

To verify proper implementation of software, software testing is an important phase in the development life cycle. Software testing is done in many phases of the life cycle. Software testing is divided mainly as two groups—Application testing and Device testing.

Software present in the PC platform is mainly called as application software. Testing of the application software is application testing. Since many hardware resources are available in PC environment, lots of testing tools are also available for application testing.

Software present in embedded environments like mobile, PDA, Calculator, Car, watch, Medical devices etc are called as embedded software. Testing of the embedded devices is device testing. In device testing, limited resources are available, because of product cost, footprint, etc. So mostly manual testing is performed for testing embedded software.

Manual Testing of embedded software has been performed for many years and it has many drawbacks. The effort involved, monotony of the job, difficulty of repeatability in some cases, time consumption and human errors are main and serious problem areas.

SUMMARY

The principal object of the embodiment is to provide a device automation framework for testing embedded and application software independently or together as a system.

Another object of the embodiment is to automate the testing process to dramatically improve the effectiveness, efficiency and coverage of embedded software testing.

Accordingly the embodiment provides a method for testing embedded device software using a device test automation framework, said method comprising of configuring a test script based on user input and device under test by a device test automation framework DTAF tool; showing different interfaces of device under test by a graphical user interface tool; simulating the hardware of the device under test using device test automation framework hardware by an application test tool; executing the test script on the device under test by the application test tool via the application software of the device under test; capturing the image of the device under test using showing different device under test interfaces by the graphical user interface tool; and producing a report based on comparison between captured image and stored image.

Also provided herein is a system for testing embedded device software using a device test automation framework, said system comprising of a device test automation framework tool for configuring a test script based on user input and device under test; a graphical user interface tool for showing different interfaces of device under test; a device test automation framework hardware simulating the hardware of the device under test; and an application test tool executing the test script, capturing image of the device under test and producing a report based on comparison between the captured image and a stored image.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

The embodiments herein, the various features, and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
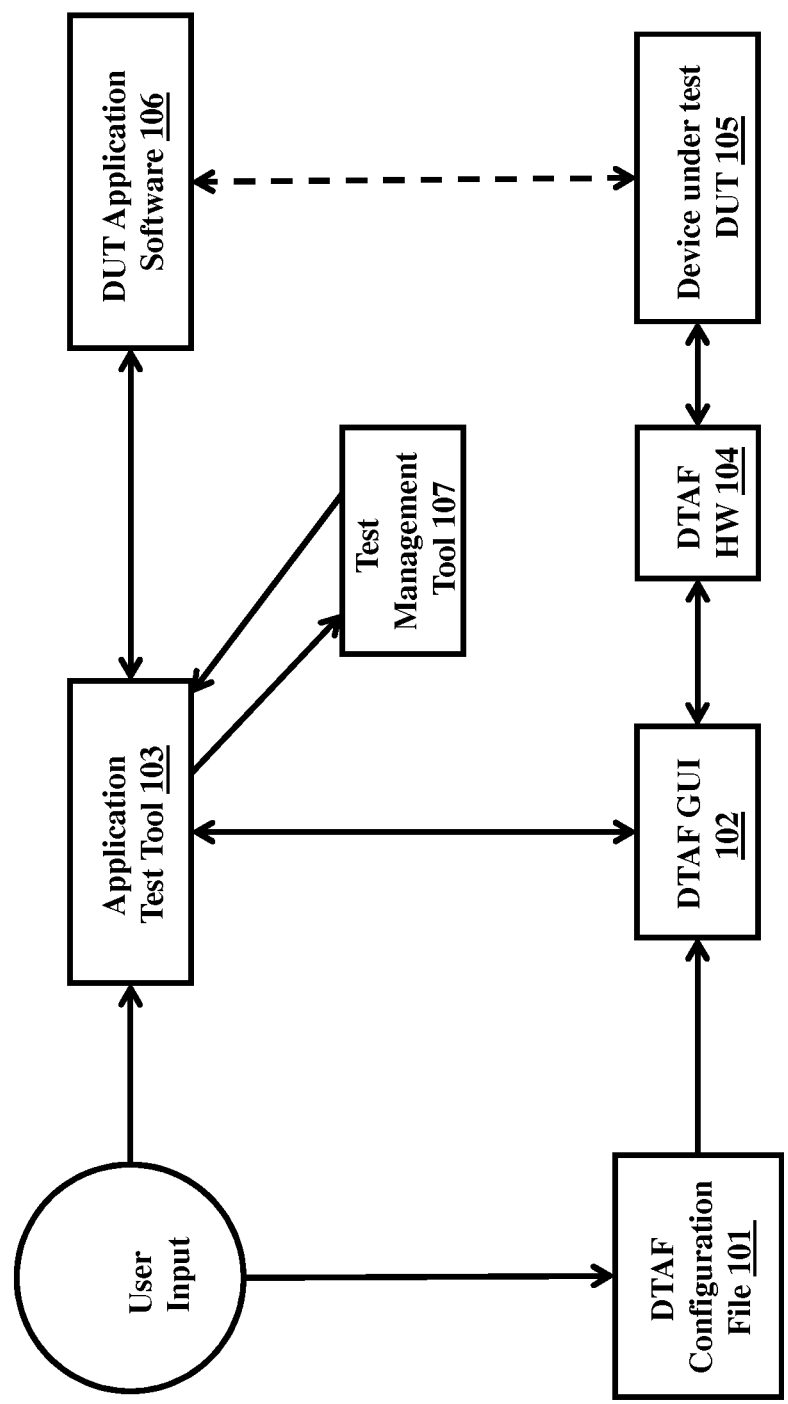
FIG. 1 illustrates a block diagram showing the device test automation framework architecture.

FIG. 1 illustrates a block diagram showing the device test automation framework architecture. The DTAF framework converts embedded device testing to an application testing. The main blocks of the device test automation framework architecture include a device test automation framework tool—DTAF tool 101, device test application framework—DTAF graphical user interface GUI 102, application test tool 103, device test application framework hardware—DTAF HW 104, device under test—DUT 105 and the user input. User will configure the system inputs like number of digital ports, analog ports, Communication channels, etc in the DTAF Configuration tool 101. The DTAF Configuration tool will generate the configuration file based on the user input. Using the configuration file and user inputs, the DTAF GUI tool 102 is launched. The DTAF GUI 102 tool generates a GUI panel for all the interfaces of the DUT 105. The DTAF HW 104 provides hardware abstraction and enables application test tools to use the hardware. The application test tool uses the DTAF GUI 102 and inputs from user to create the test script. The user can also select other saved test scripts. The application test tool 103 then executes the test and creates a test report including video/audio/image. The application test tool 103 executes a DUT application software 106 connected to the DUT 105. The DTAF configuration tool 101 defines GUI interfaces for the application test tool 103 to read and write to the digital, analog inputs/outputs. The DTAF HW 104 also provides interface for the communication channels like SPI, I2C, USB, Ethernet, Serial, etc. This enables application the test tool 103 to communicate to the embedded device. The test captures the GUI of the device and compares with the predefined screen image. The process as described above is independent of the language used for scripting. The DTAF tool 101,102 reads the image buffer of the embedded device and compares with the reference image; this GUI also performs verification automatically. The DTAF tool 101,102 simulates the touch screen inputs without the need of the user intervention. The DTAF tool 101,102 enables the touch screen simulation through the scripts, so that touch screen inputs are simulated to the embedded device and screen navigation is done automatically. The DTAF tool 101,102 can capture the audio warning tones, generate audio error tones from the devices, identify them, and validate them with the reference warnings. The DTAF tool 101,102 can also simulate the embedded device features, so that a PC based application can be tested in the absence of the embedded device. The DTAF tool 101,102 allows the testers to provide digital signatures to the reports. Embodiments as disclosed above may be applicable to various domains in Medical, Auto, Aero and industrial, wherever embedded devices are used.

The DTAF tool 101 can accept the results from the script builder and prepare the report as per the required format (configurable) and this report can be fed back to the Test management tool. This feature achieves a closed loop scenario in the DTAF. The DTAF provides placeholders for the protocols to be implemented as per the customization requirement.

Figure 2:
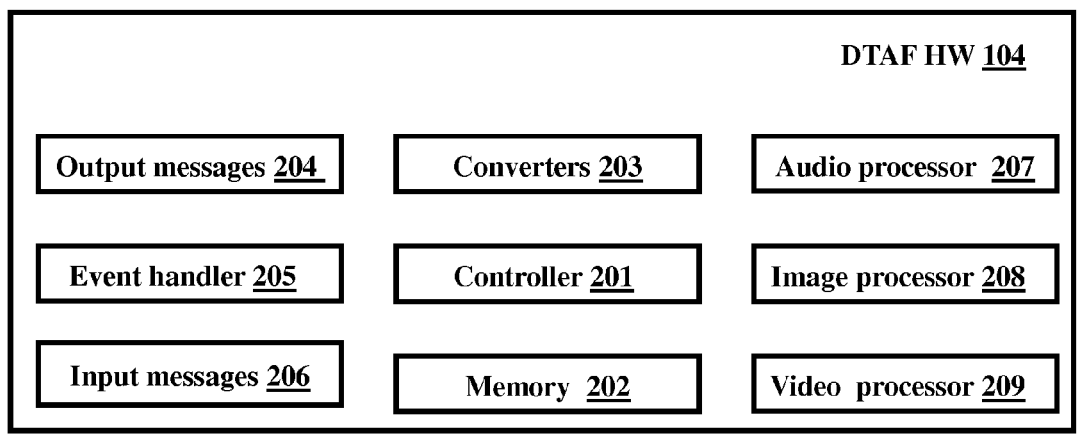
FIG. 2 illustrates a block diagram showing but not limited to the components of a device test automation framework hardware, according to embodiments disclosed herein.

FIG. 2 illustrates a block diagram showing the components but not limited to, of device test automation framework hardware, according to embodiments disclosed herein. Some of the components of the device under test automation framework include a controller 201, memory 202, converters 203, input messages 206, output messages 204, event handler 205, input messages 206, audio processor 207, image processor 208 and a video processor 209. The controller 201 contains a processor and processes all the input and output messages. The memory 202 is used to store captured results. The DUT 105 sends result to the DTAF GUI tool 102 via the DTAF HW 104. The DTAF HW 104 receives results from in many different forms like digital, analog, video, audio, image and so on. The DTAF HW 104 uses different converters 203 to convert the received data for the application test tool 103. Various processors are used for processing different types of data.

Figure 3:
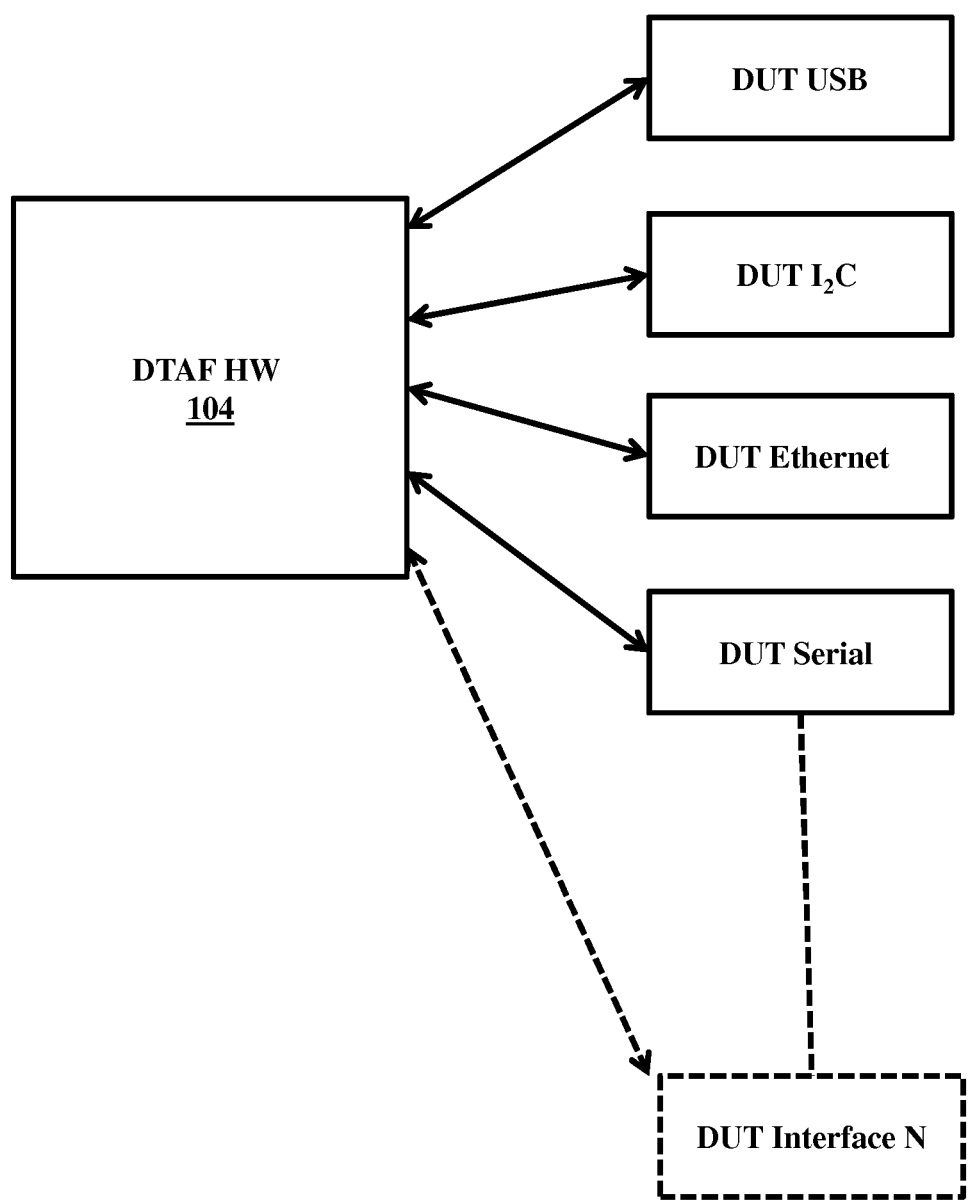
FIG. 3 illustrates a block diagram showing communication between the device test automation framework hardware and the device under test—DUT, according to the embodiments as disclosed herein.

FIG. 3 illustrates a block diagram showing communication between the device test automation framework hardware and the device under test—DUT, according to the embodiments as disclosed herein. Different interfaces of the DUT 105 are connected to the DTAF HW 104. The figure shows some the interfaces like serial port, Ethernet, USB, I2C and so on. Data from these interfaces are capable of communicating with the DTAF HW 104, which then converts them into a format for the application test tool 103. The application test tool makes use of these for preparing and executing the test.

Figure 4:
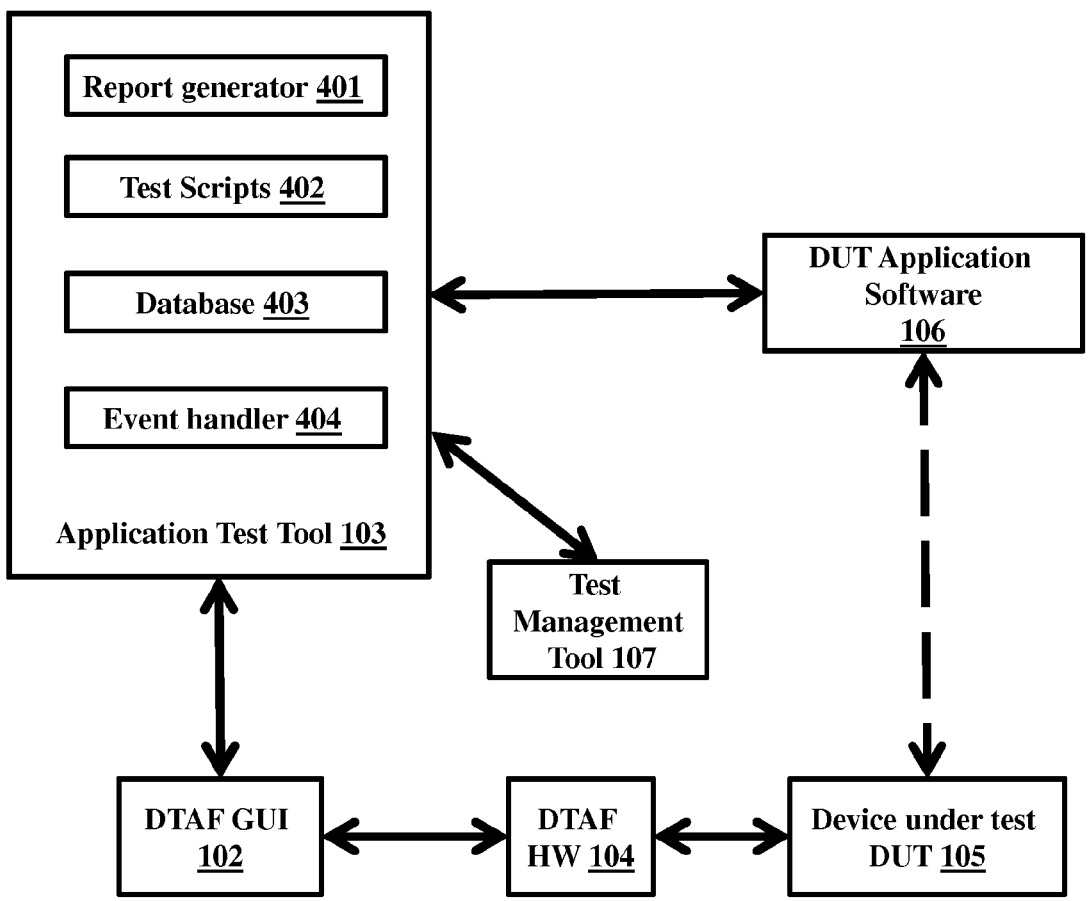
FIG. 4 is a illustrates a block diagram of the application test tool, according to the embodiments as disclosed herein.

FIG. 4 illustrates a block diagram of the application test tool, according to the embodiments as disclosed herein. Some of the components of the application test tool 103 include report generator 401, test scripts 402, database 403 and event handler 404. The test scripts are generated by the DTAF tool 101, based on the instructions from user, the system configuration and the GUI tool 202 interfaces. The application test tool 103 executes the test scripts 402. Sometimes, a test management tool 107 is used for controlling the operations of the application test tool. The test script is executed via the DUT application software 103 and DTAF GUI 102. The application test tool 103 receives information from the DUT 105 through the GUI tool 102. The test captures the GUI of the device and compares with the predefined screen image. The database 403 is used to store the information received from GUI tool 102. The report generator 401 then generator a report based on the comparison between the capture GUI of the DUT 105 and the stored predefined screen image.

Figure 5:
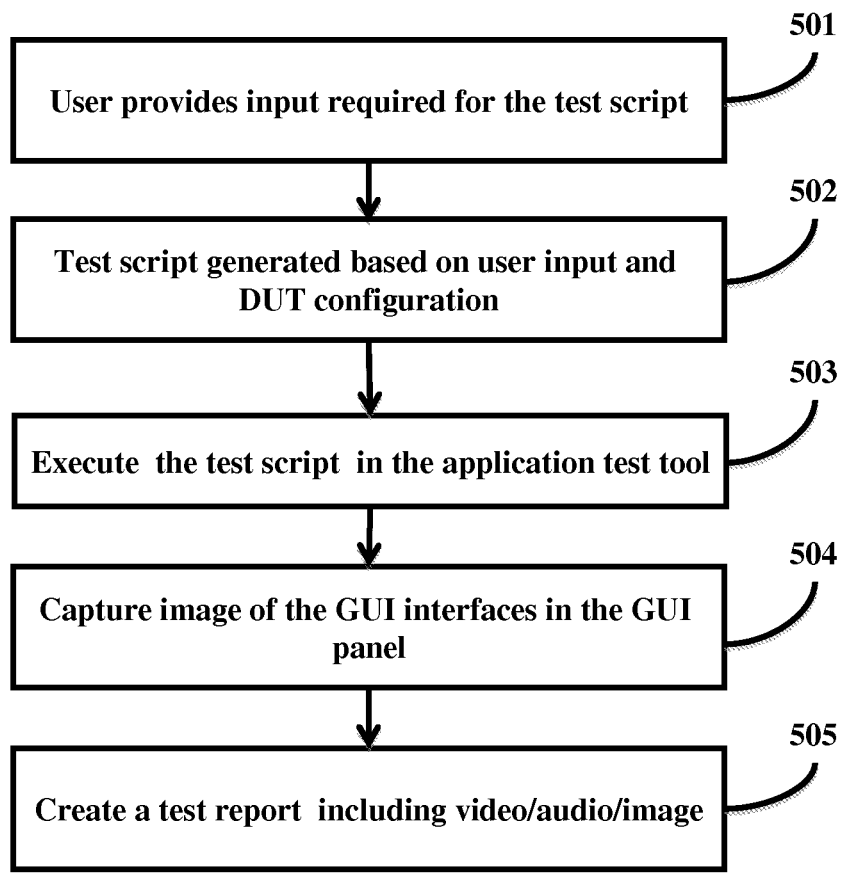
FIG. 5 is a flowchart describing the method used by application test tool for testing, according to the embodiments as disclosed herein.

FIG. 5 is a flowchart describing the method used by application test tool for testing, according to the embodiments as disclosed herein. The method begins with user providing (501) with inputs for the test script. The user also provides certain DUT 105 related system configurations. Test script is generated (502) based on user input and DUT configuration. The application test tool 103 then executes (503) the test script. Capturing of GUI interface images, analog, digital and other interfaces status is done (504) from the GUI tool. A report is created (505) based on the including video/audio/image is created based on the comparison between images capture by the GUI tool 102 through the DTAF GUI interfaces and stored data. The various actions in method 500 may be performed in the order presented, in a different order or simultaneously. Further, in some embodiments, some actions listed in FIG. 5 may be omitted.

Figure 6:
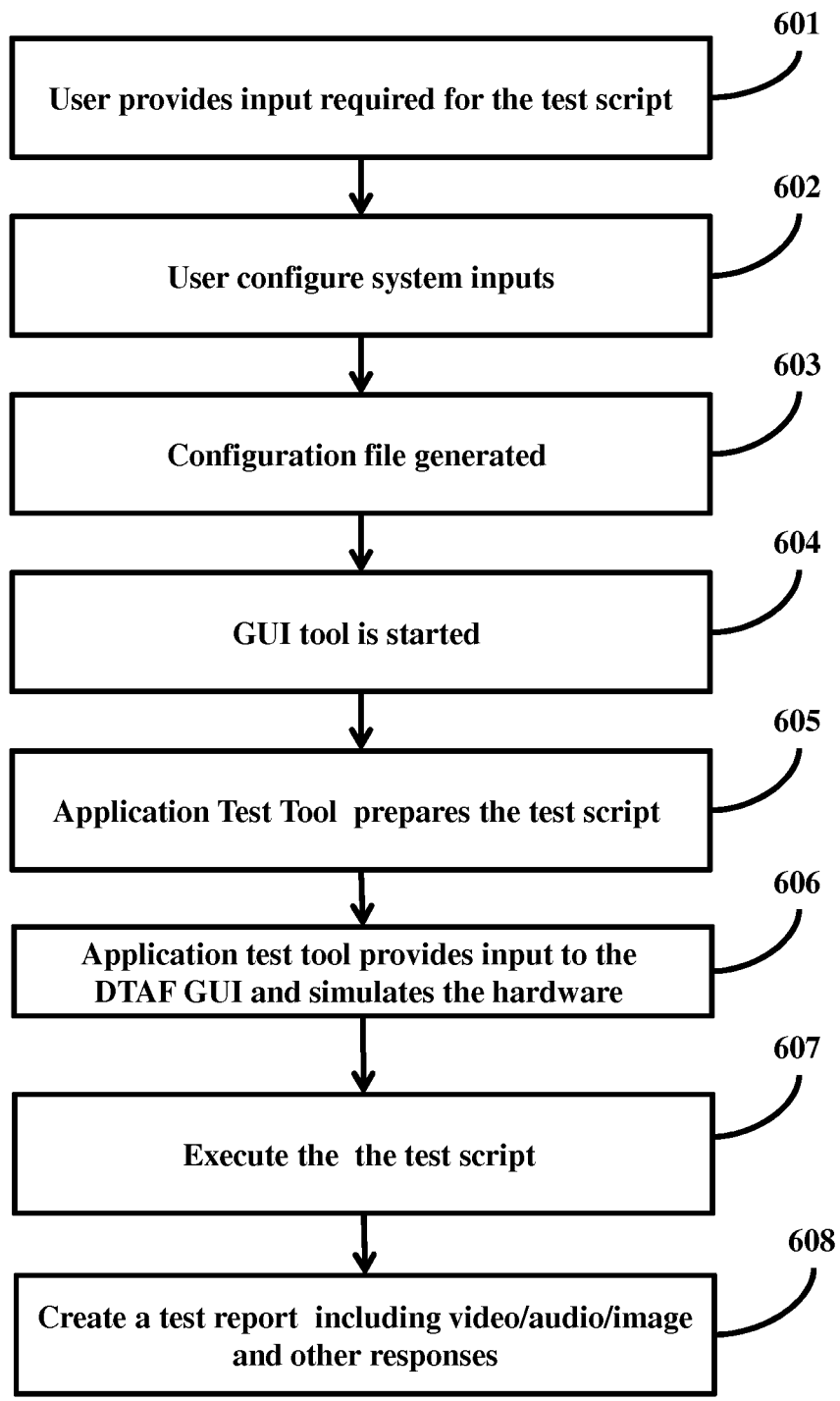
FIG. 6 is a flowchart describing the overall process flow of device test automation framework, according to the embodiments as disclosed herein.

FIG. 6 is a flowchart describing the overall process flow of device test automation framework, according to the embodiments as disclosed herein. The method begins with user providing (601) with inputs for the test script. The user also provides (602) certain DUT 105 related system configurations. The DTAF tool 101 then produces (603) a configuration file with all the information. Based on the configuration file, the GUI tool 201 is started (604). The GUI tool 201 comprises of a GUI panel showing all the GUI interfaces of the DUT 105. A DTAF HW 104 is used between the DUT 105 and GUI tool 102, which communicates with the DUT 105 and converts data to a format suitable fro the test application tool 103. The application test tool 103 prepares (605) the test script based on user input, DTAF configuration file and GUI tool 102. Application test tool provides 103 inputs to the DTAF GUI 102 and simulates (606) the hardware through the DTAF HW 104. The test script is then executed (607). A report including video/audio/image is created (608) based on the data from DUT and comparison between images capture by the GUI tool 102 through the DTAF GUI interfaces and stored data. The various actions in method 600 may be performed in the order presented, in a different order or simultaneously. Further, in some embodiments, some actions listed in FIG. 6 may be omitted.

Figure 7:
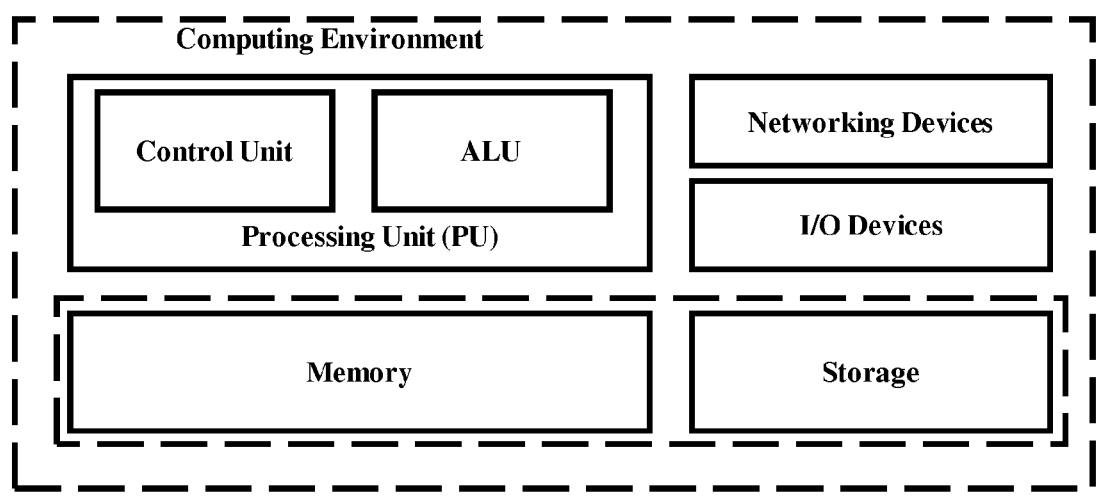
FIG. 7 illustrates a computing environment used in implementing the application, according to embodiments disclosed herein.

FIG. 7 illustrates a computing environment used in implementing the application, according to embodiments disclosed herein. The computing environment shown in FIG. 7 may be used for implementing the features and operation of the DTAF. All the components shown in the figure may be used or may not be. Further new components may also be added. As depicted the computing environment comprises at least one processing unit that is equipped with a control unit and an Arithmetic Logic Unit (ALU), a memory, a storage unit, plurality of networking devices, and a plurality Input output (I/O) devices. The processing unit is responsible for processing the instructions of the algorithm. The processing unit receives commands from the control unit in order to perform its processing. Further, any logical and arithmetic operations involved in the execution of the instructions are computed with the help of the ALU.

The overall computing environment can be composed of multiple homogeneous and/or heterogeneous cores, multiple CPUs of different kinds, special media and other accelerators. The processing unit is responsible for processing the instructions of the algorithm. The processing unit receives commands from the control unit in order to perform its processing. Further, any logical and arithmetic operations involved in the execution of the instructions are computed with the help of the ALU. Further, the plurality of process units may be located on a single chip or over multiple chips.

The algorithm comprising of instructions and codes required for the implementation are stored in either the memory unit or the storage or both. At the time of execution, the instructions may be fetched from the corresponding memory and/or storage, and executed by the processing unit. In case of any hardware implementations various networking devices or external I/O devices may be connected to the computing environment to support the implementation through the networking unit and the I/O device unit.

The embodiments disclosed herein can be implemented through at least one software program running on at least one hardware device and performing network management functions to control the elements. The elements shown in FIG. 1 include modules, which can be at least one of a hardware device, or a combination of hardware device, and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for testing embedded device software using a device test automation framework, said method comprising of:

configuring a test script based on user input and device under test by a device test automation framework DTAF tool;

showing different interfaces of device under test by a graphical user interface tool;

simulating the hardware of the device under test using device test automation framework hardware by an application test tool;

executing the test script on the device under test by the application test tool via the application software of the device under test;

capturing the image of the device under test using showing different device under test interfaces by the graphical user interface tool; and producing a report based on comparison between captured image and stored image.

2. The method of claim 1, wherein configuring of the test script based on user input and device under test is done using a device test automation framework tool.

3. The method of claim 1, wherein the graphical user interface tool comprises of graphical user interface panel showing different interfaces of device under test.

4. The method of claim 1, wherein the device test automation framework hardware communicates between the device under test and application test tool.

5. The method of claim 1, wherein the image captured of device under test includes analog, digital and other status of the graphical user interface.

6. A system for testing embedded device software using a device test automation framework, said system comprising of:

a device test automation framework tool for configuring a test script based on user input and device under test;

a graphical user interface tool for showing different interfaces of device under test;

a device test automation framework hardware simulating the hardware of the device under test; and an application test tool executing the test script, capturing image of the device under test and producing a report based on comparison between the captured image and a stored image.

7. The system of claim 6, wherein the system is configured for configuring of the test script based on user input and device under test using a device lest automation framework tool.

8. The system of claim 6, wherein the graphical user interface tool comprises of graphical user interface panel showing different interfaces of device under test.

9. The system of claim 6, wherein the device test automation framework hardware communicates between the device under test and application test tool.

10. The system of claim 6, wherein the image captured of device under test includes analog, digital and other status of the graphical user interface.

* * * * *